(12) United States Patent
Li et al.

(10) Patent No.: US 8,059,891 B2
(45) Date of Patent: Nov. 15, 2011

(54) MARKOV STATIONARY COLOR DESCRIPTOR

(75) Inventors: Jianguo Li, Beijing (CN); Tao Wang, Beijing (CN); Yurong Chen, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 990 days.

(21) Appl. No.: 11/967,208

(22) Filed: Dec. 30, 2007

(65) Prior Publication Data

US 2009/0169097 A1 Jul. 2, 2009

(51) Int. Cl.
*G06K 9/00* (2006.01)
(52) U.S. Cl. ........................................ 382/162
(58) Field of Classification Search .................. 382/100, 382/103–104, 108, 133, 155–160, 162, 165, 382/168–170, 181, 190, 220, 224, 226–228, 382/276, 278, 291, 294; 348/143, 149, 154–155, 348/169, 700, 703; 702/19, 22, 179
See application file for complete search history.

(56) References Cited

U.S. PATENT DOCUMENTS

| | | | | |
|---|---|---|---|---|
| 5,915,036 A * | 6/1999 | Grunkin et al. | ............... | 382/132 |
| 6,263,103 B1 * | 7/2001 | Freeman et al. | ............... | 382/173 |
| 6,751,354 B2 * | 6/2004 | Foote et al. | ................... | 382/224 |
| 7,062,083 B2 * | 6/2006 | Lim et al. | ...................... | 382/164 |
| 7,130,465 B2 * | 10/2006 | Muenzenmayer et al. | ... | 382/190 |
| 7,310,589 B2 * | 12/2007 | Li | ................................ | 702/179 |
| 7,509,580 B2 * | 3/2009 | Sezan et al. | .................... | 715/719 |
| 7,657,100 B2 * | 2/2010 | Gokturk et al. | ............... | 382/209 |
| 7,711,174 B2 * | 5/2010 | Sammak et al. | ............. | 382/133 |
| 7,814,040 B1 * | 10/2010 | Zhang et al. | .................... | 706/45 |

OTHER PUBLICATIONS

Bingbing, Li et al., "Directed Markov Stationary Features for Visual Classification", Accoustics, Speech and Signal Processing, ICASP 2009, Apr. 2009, pp. 825-828.*
Schwartz, William Robson et al., "Texture Classification Based on Spatial Dependence Features Using Co-occurrence Matrices and Markov Random Fields", 2004 International Conference on Image Processing, Oct. 2004, pp. 239-242.*
Benezeth, Y. et al., "Abnormal Events Detection Based on Spatio-Temporal Co-Occurrences", Computer Vision and Pattern Recognition 2009, Jun. 2009, pp. 2458-2465.*

* cited by examiner

*Primary Examiner* — Jose Couso
(74) *Attorney, Agent, or Firm* — Carrie A. Boone, P.C.

(57) ABSTRACT

A method for generating a Markov stationary color (MSC) descriptor is disclosed. The MSC descriptor may be used for image/video content representation, which characterizes both intra-color and inter-color spatial relationships in images. The MSC descriptor has a low storage requirement, relative to some other color descriptors.

15 Claims, 7 Drawing Sheets

MARKOV STATIONARY COLOR DESCRIPTOR

TECHNICAL FIELD

This application relates to color and, more particularly, to an improved color descriptor.

BACKGROUND

Color is an attribute used in image description, similarity, and retrieval tasks, due to its expressive power and simplicity. There are many color descriptors used for this purpose. However, existing color descriptors have their limitations. Color histogram and color moments do not involve the spatial relationships among colors. The color histogram represents the relative frequency of the occurrence of various color values within an image. Color moments are used to describe fundamental statistical properties of the color distribution. Color coherence vectors (CCV) partition pixels falling in each color histogram bin into coherent and non-coherent pixels. Hence, CCV only involves intra-color structure information. Color correlograms extend the co-occurrence matrix method used in texture analysis to the color domain, and express how the color spatial correlation changes with distance. Full color correlograms (full-CC) are unstable and require too much storage to be practical. A simplified correlogram, called a color auto-correlogram (CAC), adopts the diagonal elements of the full correlogram as features. Therefore, CAC loses the inter-color structure information.

There are cases that these traditional color descriptors cannot discriminate, as shown in FIG. 1. Images 10 and 20 each have three colors, A, B, and C. Color histograms, color moments, CCVs, and CACs, cannot discriminate between the image 10 and the image 20, since the images have the same color histogram and intra-color structural distribution.

A Markov chain is a sequence of randomly observed variables, $\{X_n, n \geq 0\}$, with the Markov property: given the present state, the future and past states are independent. Formally:

$$p(X_{n+1}|X_n, \ldots, X_1) = p(X_{n+1}|X_n).$$

All possible values of $X_n$ form a countable set, S, the state space of the Markov chain. For a K-color-level image, the state space is denoted as $S = \{c_1, \ldots, c_k\}$.

A Markov chain will totally depend on two basic ingredients: a transition matrix and an initial distribution. For the transition probability from state, $c_i$ to $c_j$, denoted as $p_{ij} = p(X_1 = c_j | X_0 = c_i)$, the Markov transition matrix, $P = (p_{ij})_{K \times K}$, should follow two properties: (1) $p_{ij} \geq 0$, $\forall c_i \in S$, $c_j \in S$, and (2)

$$\sum_{j=1}^{K} p_{ij} = 1.$$

According to the probabilities of the Markov transition matrix, the transition probability from the spatial co-occurrence matrix, $C = (c_{ij})_{K \times K}$, is $$p_{ij} = c_{ij} / \sum_{j=1}^{K} c_{ij}.$$

Suppose the state distribution after n steps is $\pi(n)$, the Markov transition matrix should obey the following state transition rule: $\pi(n+1) = \pi(n)P$, $\pi(n) = \pi(0)P^n$, from which the following definition is obtained: A distribution, $\pi$, is called a stationary distribution when $\pi = \pi P$ is satisfied.

According to a Chapman-Kolmogorov equation, for a stationary distribution, $\pi = \pi P = \ldots = \pi P^n$. Hence, the stationary distribution is known as an invariant measure of a Markov chain. The intuitive idea is to adopt the stationary distribution as the compact representation of the Markov chain. However, the existence and uniqueness of the stationary distribution for any Markov transition matrix must be guaranteed.

Concretely, the problem can be answered by the following fundamental limitation theorem: The limitation $$A = \lim_{n \to \infty} \frac{1}{n+1}(I + P + P^2 + \ldots + P^n)$$

exists for all state-countable Markov chains. When the chain is regular, A is a matrix whose rows are equal to a unique probabilistic vector (i.e., the elements are all positive and add to 1).

According to the above theorem, it is not hard to show that each row of the matrix A is the stationary distribution for the regular Markov chain. Hence, this theorem tells the existence of a unique stationary distribution, and a way for computing the stationary distribution.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a method for generating a novel color descriptor, the Markov stationary color (MSC) descriptor, is disclosed. The MSC descriptor may be used for image/video content representation, which characterizes both intra-color and inter-color spatial relationships in images. In some embodiments, the MSC descriptor has a very low storage requirement.

Figure 2:
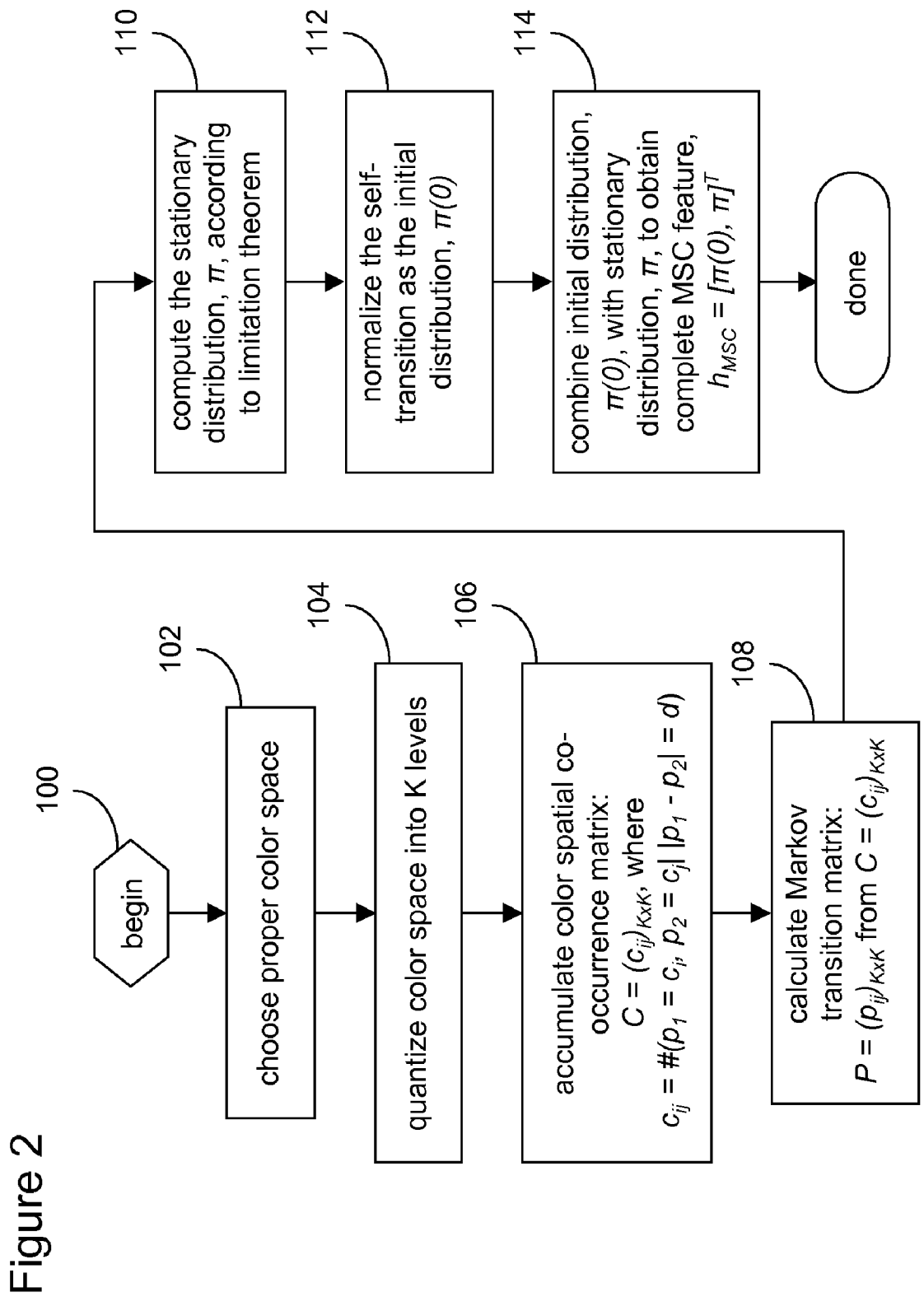
FIG. 2 is a flow diagram of a method to generate a Markov stationary color descriptor, according to some embodiments.
Figure 3:
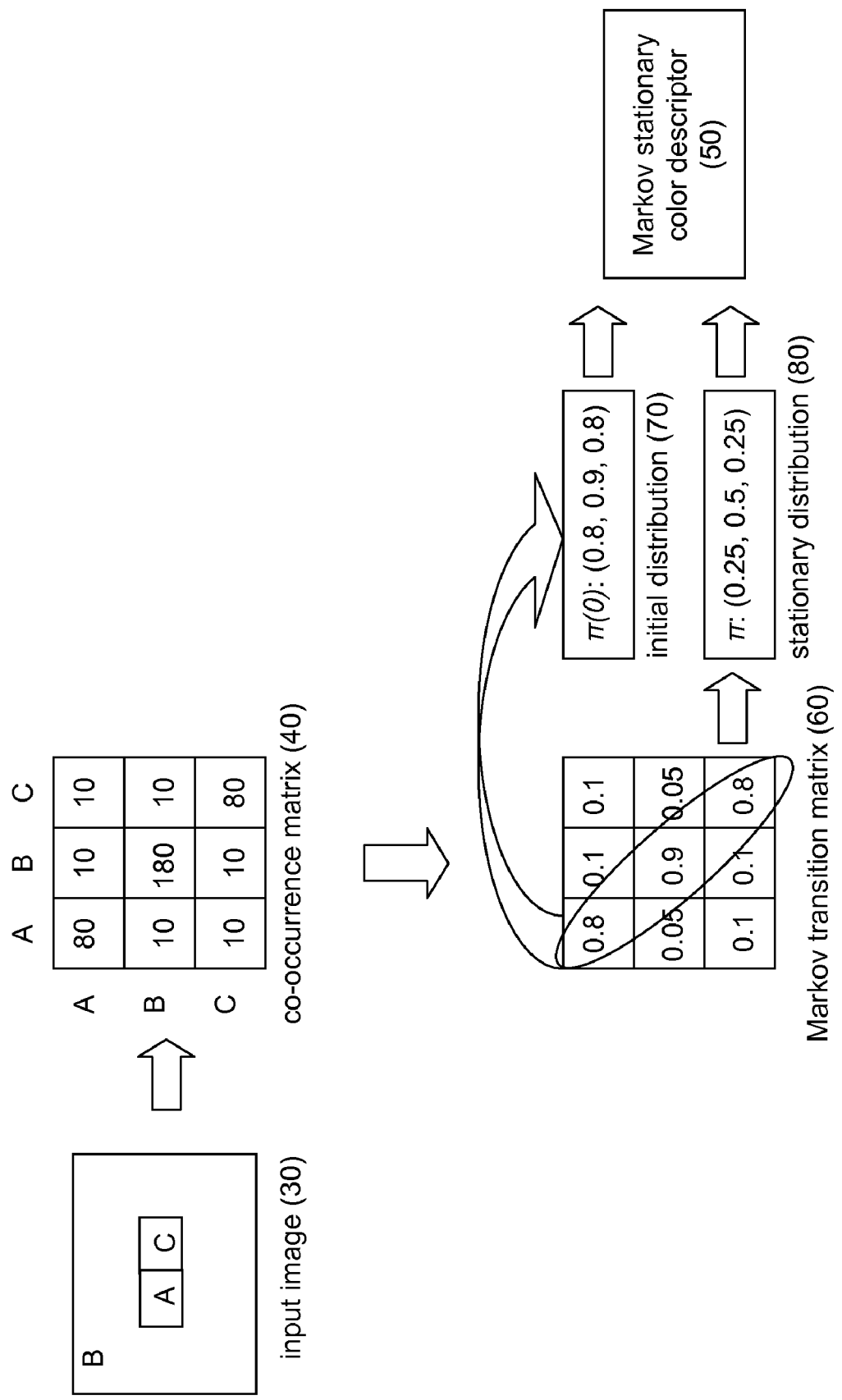
FIG. 3 is a diagram of the Markov stationary color descriptor generation method of FIG. 2, according to some embodiments.

FIGS. 2 and 3 are a flow diagram and pictorial representation, respectively, of a Markov stationary color (MSC) descriptor method 100, according to some embodiments. The MSC descriptor method 100 takes an input image 30, generates a co-occurrence matrix 40 from the image, and produces a Markov transition matrix 60 from the co-occurrence matrix. From the Markov transition matrix 60, an initial distribution 70 and a stationary distribution 80 are generated and combined, resulting in a Markov stationary color (MSC) descriptor 50.

The method 100 for generating the MSC descriptor 50 is motivated by the Markov chain theory described in the background section. The color spatial co-occurrence matrix 40 may be viewed as a Markov probability transition matrix. In some embodiments, use of the MSC descriptor 50 improves the performance of applications where traditional color descriptors are used.

The MSC descriptor method 100 employs a Markov chain to model the color spatial co-occurrence information of a given image. In this way, the Markov chain transforms the color co-occurrence matrix 40 to the Markov transition matrix 60, and adopts the initial distribution 70 and the stationary distribution 80 of the Markov chain as a compact representation of the input image 30.

In the flow diagram of FIG. 2, the MSC descriptor method 100 chooses a proper color space (block 102) and quantizes the selected color space into K levels (block 104). These steps (102 and 104) are commonly performed for all color descriptor methods, such as color histogram, CAC, CCV, and so on.

The succeeding steps in FIG. 2, however, are not performed by prior art color descriptor methods. The MSC descriptor method 100 accumulates a color spatial co-occurrence matrix 40, where the co-occurrence matrix is denoted, $C=(c_{ij})_{K \times K}$, where $c_{ij}=\#(p_1=c_i, p_2=c_j||p_1-p_2|=d)$, where $p_1$ and $p_2$ are pixels in the image, $c_i$, $c_j$ are the color levels of the pixels, and d is the distance between two pixels, $p_1$ and $p_2$ (block 106). Once the co-occurrence matrix 40 is accumulated, the MSC descriptor method 100 calculates a Markov transition matrix 60, denoted $P=(P_{ij})_{K \times K}$ from the co-occurrence matrix 40, $C=(c_{ij})_{K \times K}$ (block 108).

Once the Markov transition matrix 60 is calculated, both an initial distribution 70 and a stationary distribution 80 may be obtained. Accordingly, a limitation theorem is used to compute the stationary distribution 50 (block 110). The limitation theorem states that, the limitation, $$A = \lim_{n \to \infty} \frac{1}{n+1}(I + P + P^2 + \ldots + P^n),$$

exists for all state-countable Markov chains. When the chain is regular, A is a matrix whose rows are equal to a unique probabilistic vector (i.e., the elements are all positive and add to 1). The MSC descriptor method 100 also normalizes the self-transition as the initial distribution, $\pi(0)$ (block 112), and combines it with the stationary distribution, $\pi$, to obtain the complete MSC descriptor 50, given by $h_{MSC}=[\pi(0), \pi]^T$, where T is a mathematical transpose (block 114). The self-transition indicates a transition within each color level, as indicated by the diagonal elements of the co-occurrence matrix 40. To make the self-transition a distribution, it is first normalized to unit length.

In some embodiments, the MSC descriptor 50 is a unique and invariant measure of the full-color co-occurrence matrix 40. Hence, the MSC descriptor 50 may characterize not only intra-color structure information but also inter-color structure information. Further, the MSC descriptor 50 is a compact descriptor with only 2×K feature elements for K quantized color levels. This is comparable to a color histogram, which uses K elements for the same case, and is significantly less storage than is necessary for the full color correlogram, which uses $K^2$ elements for the same case.

The MSC descriptor 50 may be used for applications in which traditional color descriptors are used, such as image/video retrieval, video summarization, scene understanding, visual surveillance, digital home entertainment, vision based smart health care, and so on. In some embodiments, the MSC descriptor 50 is the preferred color descriptor for multimedia content description, and may result in a performance improvement over traditional color descriptors (at least 10%, in some cases, up to 50%).

Table 1 is shows retrieval performance of different color descriptors on two different image/video databases, COREL subset (denote as sub-COREL) and TRECVID. The retrieval performance is measured by mean-average-precision on all categories. As the results indicate, the MSC descriptor 50 performed better than the other color descriptors on both of the databases.

TABLE 1

Retrieval of performance of different color descriptors on two image/video databases.

| database | color histogram | color moment | CCV | CAC | MSC 50 |
| --- | --- | --- | --- | --- | --- |
| sub-corel | 0.7982 | 0.6816 | 0.8074 | 0.8269 | 0.8860 |
| TRECVID | 0.3270 | 0.2242 | 0.3822 | 0.3924 | 0.4394 |

In some embodiments, the MSC descriptor 50 characterizes not only intra-color structure information but also inter-color structure information. This is not only a great advance over using a color histogram, which does not catch any color structure information, but also a great advance over use of either a color auto-correlogram or a color coherence vector, as these two color descriptors characterize only the intra-color structure information.

The MSC descriptor 50 is a compact color representation (2×K elements for K different quantized color levels), which is comparable to the color histogram (K elements in the same case), and has significantly lower storage than the full co-occurrence matrix or full correlogram ($K^2$ elements in the same case).

Color descriptors are widely used in image processing, computer vision, and multi-media related applications, such as image/video retrieval, video summarization, scene understanding, visual surveillance, digital home entertainment, vision based smart health care, and so on. An MPEG-7 draft standard also includes a series of conceptual-level color descriptors for multimedia content description. However, there are many limitations of using the current concrete color feature implementations, such as color histograms, color moments, color correologams, and color coherence vectors, as described above.

In some embodiments, the MSC descriptor 50 shows not only theoretical improvement over existing color descriptors, but also great performance improvement in practical applications, such as image/video retrieval. Consequently, the MSC descriptor 50 may be viewed as a concrete and improved implementation of the conceptual-level MPEG-7 color structure descriptor. Therefore, the MSC descriptor 50 may be employed in applications in which traditional color descriptors are used, may further yield performance improvement in these applications, and may render possible some applications deemed impractical in the past.

The MSC descriptor method 100 and the prior art color correlogram are both based on the color co-occurrence matrix 40. However, the MSC descriptor method 100 handles the co-occurrence matrix 40 differently than in prior art color descriptors. The MSC descriptor 50 considers the stationary representation of the co-occurrence matrix (i.e., the stationary distribution of the corresponding Markov transition matrix), thus encoding both intra-color and inter-color structure information, in contrast to the color correlogram method.

The background section presented a theoretic justification that the stationary distribution is a unique and invariant measure of the Markov transition matrix 60. The MSC descriptor 50 may therefore be defined as the combination of the initial distribution 70, π(0), and the stationary distribution 80, π. The initial distribution 70 may not be neglected, since a Markov chain is determined not only by its transition matrix 60 but also by its initial distribution 70. In some embodiments, there is no guarantee that initial distributions 70 are the same for all images 30. Further, there is no guarantee that the Markov chain is a strict stationary process for all images (i.e., π(0)=π, for all images). The combination may also be interpreted from the following perspective: 1) the initial distribution encodes the intra-color transitions (self-transitions); and 2) the stationary distribution is a unique and invariant measure of the Markov transition matrix, and thus encodes the inter-color transitions.

The MSC descriptor method 100 may be implemented in software, hardware, or a combination of hardware and software. Where the MSC descriptor method 100 is software-based, the MSC descriptor method 100 may be executed in a processor-based system, in some embodiments.

Experimental Results

Figure 1:
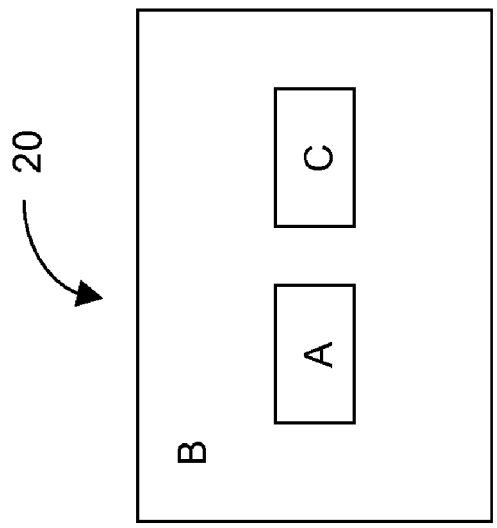
FIG. 1 is a diagram of distinct images that traditional color descriptors are unable to discriminate, according to the prior art.
Figure 1:
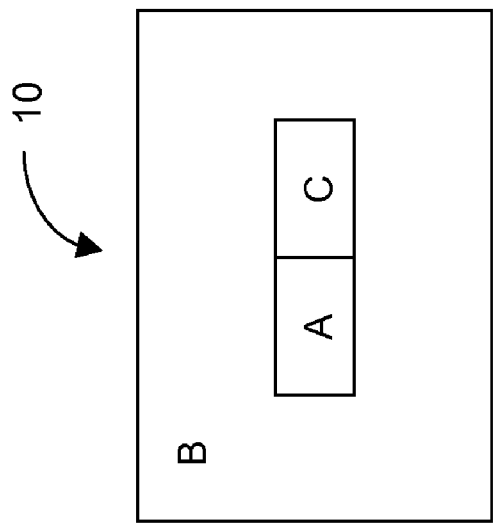
Figure 4:
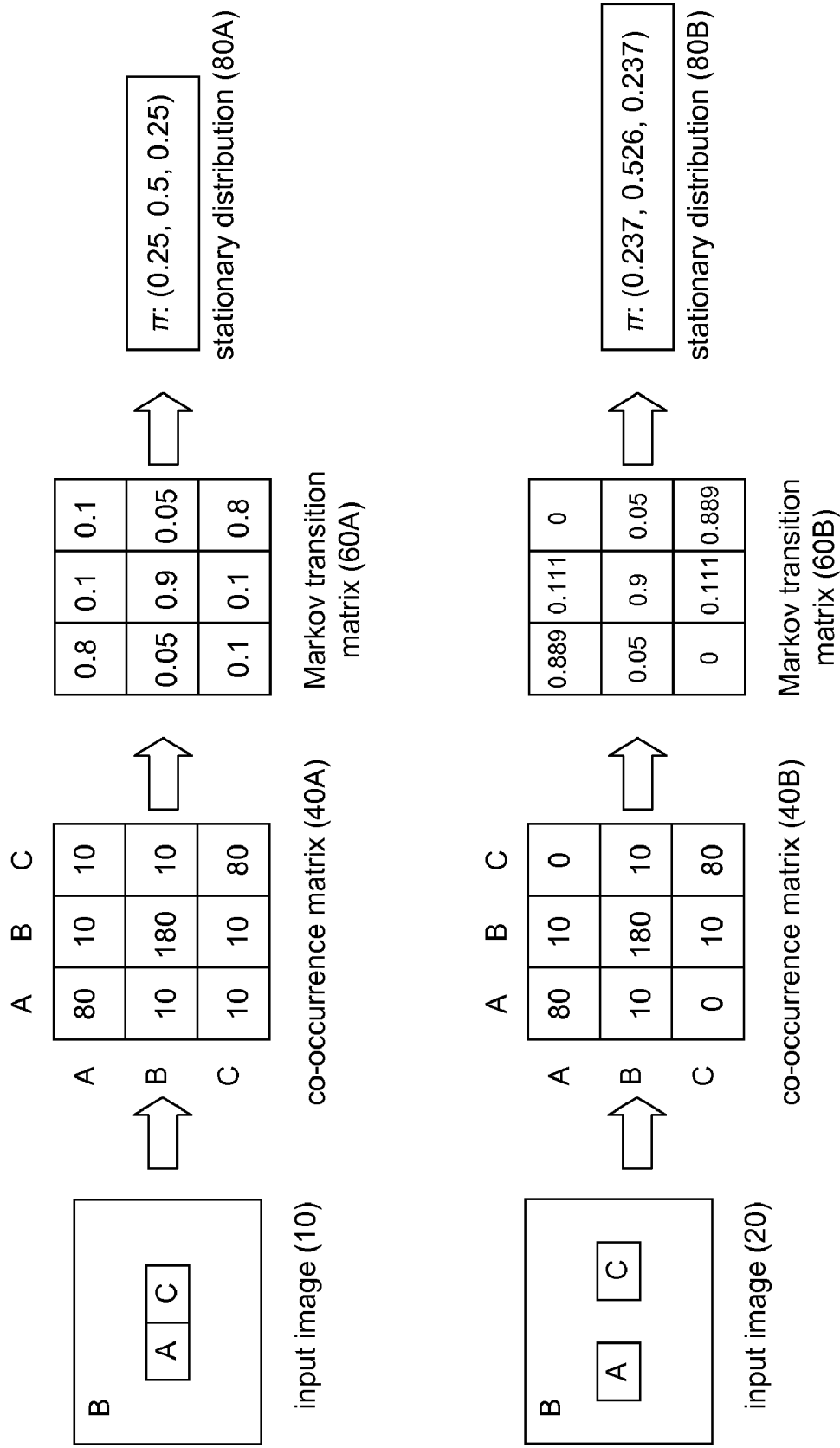
FIG. 4 is a diagram of using the method of FIG. 2 to produce unique stationary distributions for each of the images of FIG. 1, according to some embodiments.

Empirical tests using the MSC descriptor 50 are compared with other color descriptors, according to some embodiments. The images 10 and 20 of FIG. 1 are used for the color descriptor tests. Suppose the histogram of three colors in the two images 10 and 20 (FIG. 1) is $h_A$, $h_B$ and $h_C$. FIG. 4 shows the MSC descriptor method 100 performed on the images 10, 20, of FIG. 1, according to some embodiments. The image 10 has an accumulated color spatial co-occurrence matrix 40A and calculated Markov transition matrix 60A, resulting in stationary distribution 80A. The image 20 has an accumulated color spatial co-occurrence matrix 40B and calculated Markov transition matrix 60B, resulting in stationary distribution 80B. Note that the transition matrixes 60A and 60B are not necessarily symmetrical, as in the co-occurrence matrixes 40A and 40B. Using CAC, the input images 10 and 20 have the same CAC feature, i.e., [80/$h_A$, 180/$h_B$, 80/$h_C$]. However, using the MSC descriptor method 100, the stationary distributions 80A and 80B are not the same.

Figure 5:
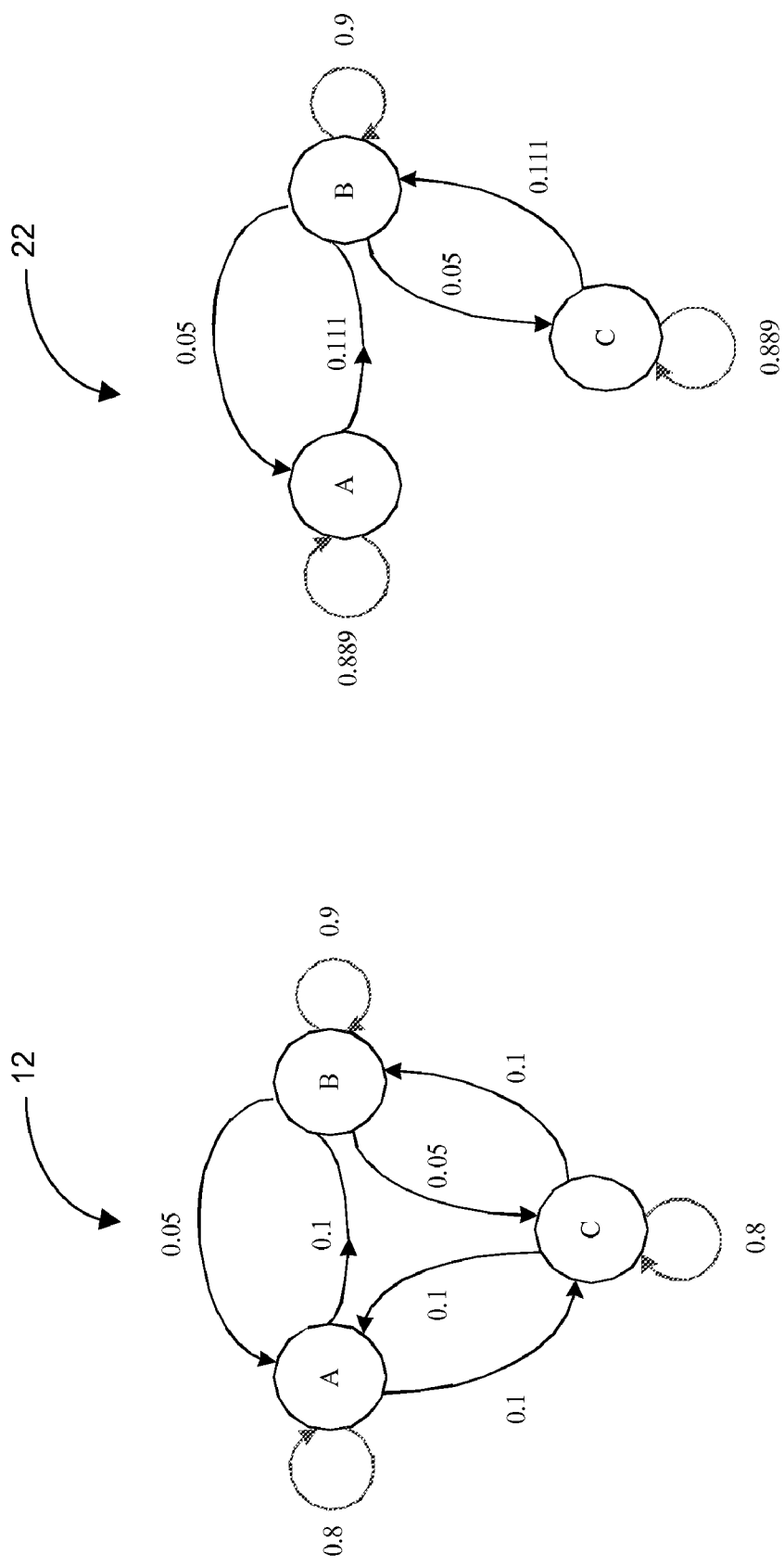
FIG. 5 is a diagram of Markov chains to model the color spatial co-occurrence for the images of FIG. 1, according to some embodiments.

FIG. 5 shows graphs 12 and 22 of one-step Markov chains of the transition matrixes 60A and 60B, respectively, according to some embodiments. The stationary distributions 80A and 80B (FIG. 4) are computed according to the limitation theorem. The two images 10 and 20 have different stationary distributions 80A and 80B.

Figure 6:
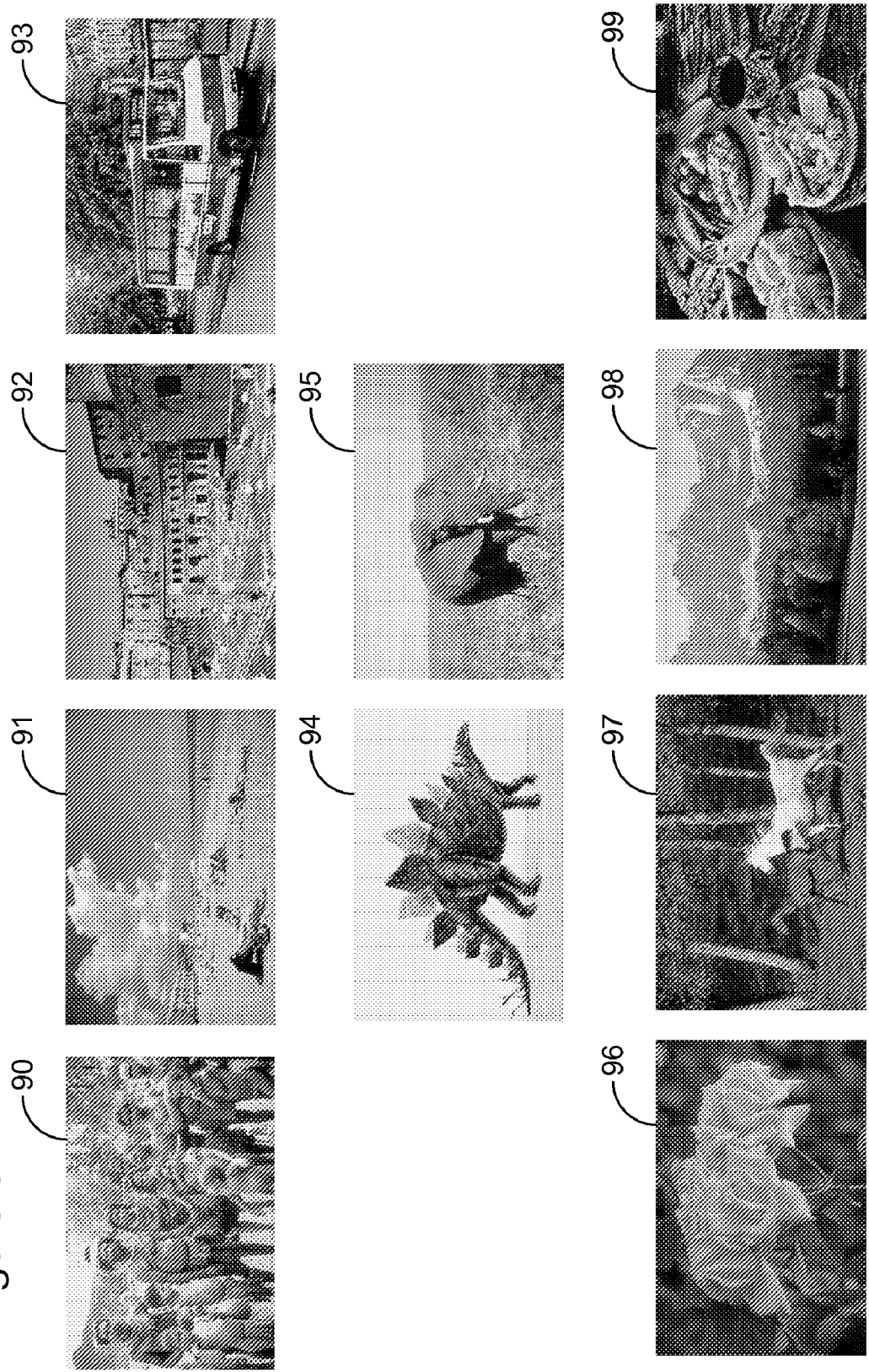
FIG. 6 is a depiction of example images used to test the Markov stationary color descriptor method of FIG. 2, according to some embodiments.

In the experiments, the image retrieval performance of the MSC descriptor 50 is evaluated in comparison with traditional color features, color histograms (CH), color moments (CM), CCV, CAC, and full color correlogram (Full-CC). To be comparable, the experiment adopts the simplest fixed-distance method and sets d=1 to compute the co-occurrence matrix in MSC, CAC and FullCC. To provide numerical results on the performance, the system is evaluated based on a controlled subset of a COREL database, as disclosed by Jia Li and James Z. Wang, in their paper, "Automatic linguistic indexing of pictures by a statistical modeling approach", IEEE Transactions on Pattern Analysis and Machine Intelligence, vol. 25, no. 9, pp. 1075-1088, 2003. The subset includes ten image categories, as shown in FIG. 6: African people and villages 90, beach 91, buildings 92, buses 93, dinosaurs 94, elephants 95, flowers 96, horses 97, mountains and glaciers 98, and dishes of food 99. Each category contains a hundred images without multiple annotations. Hence, there are a thousand images total in the data set.

In the experiment, the color features are first extracted from the image database. In some embodiments, hue-saturation-value (HSV) color space is used for color feature extraction. Thus, the images are transformed into HSV space. Further, the space is quantized into 166 color levels, in some embodiments. Support vector machines (SVM) are adopted as the base classifier, and the model is trained for each category using forty positive images. The SVM models adopt RBF kernels for five color features, and the kernel parameters are well-tuned by cross-validation, in some embodiments. Furthermore, the SVM models are trained with probabilistic output so that the retrieved list may be ranked by the probabilistic score. The retrieval performance is evaluated on six hundred images outside the training set, and judged by an average precision (AP) score, which is the most widely used criteria for evaluating performance of information retrieval systems. Average precision score is defined as follows:

$$AP = \frac{\sum_{r=1}^{N}(P(r) \times rel(r))}{\#relevant},$$

where r is the rank, N is the number of retrieved images, # relevant is the number of relevant images in N, P(r) is the precision at the given cut-off rank r, and rel(r) is a binary function indicating whether the image at the current rank position is relevant to the queried retrieval or not.

Results of each color feature on the ten categories are listed in Table 2, according to some embodiments. The mean average-precision (MeanAP) is also listed in the final row of the table. The MSC descriptor 50, generated using the MSC descriptor method 100 described above, convincingly outperforms other color descriptors. The MSC descriptor 50 even dominates the full-color correlogram in most cases. Although the full color correlogram contains the whole color co-occurrence information, it also involves much noise, which will generally hurt the retrieval performance.

TABLE 2

Image retrieval performance on controlled COREL (measured AP).

| categories | CH | CM | CCV | CAC | full-CC | MSC 50 |
| --- | --- | --- | --- | --- | --- | --- |
| African | 0.8351 | 0.7023 | 0.8909 | 0.9030 | 0.8910 | 0.9460 |
| Beach | 0.6032 | 0.5705 | 0.6034 | 0.6220 | 0.7513 | 0.7184 |
| Buildings | 0.7073 | 0.3863 | 0.7046 | 0.7739 | 0.7708 | 0.8058 |
| Buses | 0.7894 | 0.8479 | 0.8838 | 0.8618 | 0.8937 | 0.9364 |
| Dinosaurs | 0.9994 | 0.9975 | 0.9981 | 0.9946 | 0.9974 | 1.0000 |
| Elephants | 0.8524 | 0.4654 | 0.7301 | 0.8385 | 0.8462 | 0.8559 |
| Flowers | 0.9307 | 0.5466 | 0.8922 | 0.9334 | 0.9676 | 0.9750 |
| Horses | 0.9768 | 0.9611 | 0.9181 | 0.9892 | 0.9937 | 0.9958 |
| Mountains | 0.4245 | 0.6091 | 0.6073 | 0.4578 | 0.6400 | 0.6855 |
| Food | 0.8631 | 0.7296 | 0.8453 | 0.8949 | 0.9337 | 0.9413 |
| MeanAP | 0.7982 | 0.6816 | 0.8074 | 0.8269 | 0.8685 | 0.8860 |

In some embodiments, the MSC descriptor 50 is compared with other color descriptors on the performance of video retrieval. The test bed is the TRECVID evaluation. TRECVID is an annual workshop on video retrieval evaluation hosted by the National Institute of Standards and Technology (NIST). TRECVID provides a full protocol for evaluating the performance of a video retrieval system on large amounts of digital video (hundreds of hours of news video). The participants include not only research groups worldwide but also many industry organizations such as IBM, Microsoft, AT&T, and so on. There are several tasks in the TRECVID evaluation. In some embodiments, the experiment compares the color descriptor on the task of concept detection, which aims to retrieve video shots containing certain semantic concepts from a given video database.

In some embodiments, the experiment adopts the TRECVID 2005 developing video data sets as the target database since it contains annotations for all concepts. The database is divided into two parts: the video sequences 141~240 as the training set, and the video sequences 241~277 as the testing set. This yields that the training set has more than 31,000 video shots, while the testing set contains about 12,000 video shots, and totally about 100 hours of MPEG-1 video data.

Figure 7:
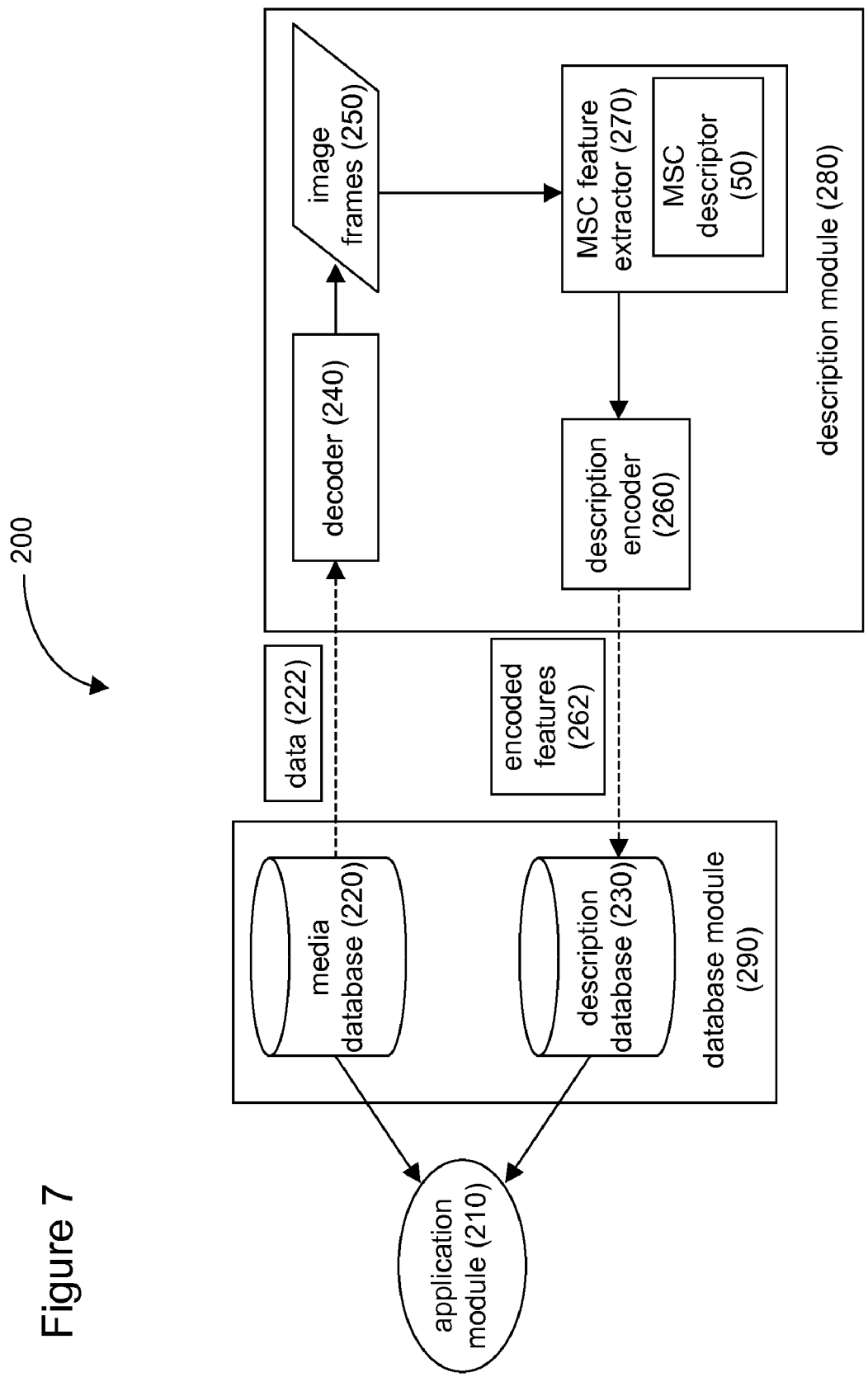
FIG. 7 is a flowchart of video retrieval evaluation of the Markov stationary color descriptor method of FIG. 2, according to some embodiments.

The MSC descriptor 50 may be applied in a variety of multimedia content analysis systems, such as content-based image/video retrieval, image/video tagging, etc. FIG. 7 illustrates a flow chart of such a system 200, according to some embodiments. The system 200 includes an application module 210, a database module 290, and a description module 280. The MSC descriptor 50 plays the role for multimedia content description. In the application module 210, the applications may be content-based image/video retrieval, image/video tagging, and so on. The database module 290 includes a media database 220 and a description database 230. The description module includes a decoder 240, image frames 250, MSC feature extractor 270, and description encoder 260.

From the media database 220, the description module 280 first decodes input media data 222, using the decoder 240, into the image frames 250. The MSC feature extractor 270 of the description module 280 employs the MSC descriptor 50 to perform feature extraction. From this, the description module 280 encodes the features, using the description encoder 260, into some certain format, and stores the encoded features 262 into the description database 230. Applications are built on the media database 220 and the description database 230.

Each shot is represented by visual features extracted from several key frames. Here, color features are adopted as the visual feature representation, and their retrieval performance is compared. The full color correlogram experiments are not done in this case, since they require too much storage for such a large database. The retrieval system is trained by the SVM classifier on the training set for each concept, and the training procedure is similar to that in the image retrieval section. The performance of different color descriptors is evaluated on fifteen scenes and locations related concepts (refer to the result table for details of concepts) in the testing set. The final retrieval performance is measured by the average precision of the top 2000 retrieved shots (this is the standard evaluation criteria by TRECVID), and results are reported in Table 3, according to some embodiments. The MSC descriptor 50 outperforms other color descriptors in this application.

TABLE 3

Video retrieval performance on TRECVID (measured by AP)

| concepts | CH | CM | CCV | CAC | MSC |
|---|---|---|---|---|---|
| Animal | 0.4555 | 0.2215 | 0.4766 | 0.5415 | 0.5475 |
| Building | 0.1414 | 0.1018 | 0.2333 | 0.2418 | 0.2566 |
| Car | 0.2233 | 0.1797 | 0.3345 | 0.3087 | 0.3503 |
| Explosion-Fire | 0.0652 | 0.0699 | 0.1132 | 0.1296 | 0.1598 |
| Maps | 0.6244 | 0.4698 | 0.6749 | 0.6798 | 0.7055 |
| Mountain | 0.2180 | 0.1460 | 0.2173 | 0.2534 | 0.3022 |
| Outdoor | 0.7014 | 0.6061 | 0.7517 | 0.7046 | 0.7734 |
| Road | 0.1789 | 0.1180 | 0.2483 | 0.2497 | 0.2917 |
| Snow | 0.1681 | 0.0944 | 0.2057 | 0.1743 | 0.2322 |
| Sky | 0.4464 | 0.2818 | 0.5728 | 0.5227 | 0.6179 |
| Sports | 0.3042 | 0.2262 | 0.4419 | 0.3842 | 0.4734 |
| Urban | 0.0763 | 0.0614 | 0.1614 | 0.1900 | 0.2163 |
| Vegetation | 0.2914 | 0.2086 | 0.3442 | 0.3615 | 0.3728 |
| Waterscape | 0.2713 | 0.1600 | 0.1857 | 0.2769 | 0.4145 |
| Weather | 0.7390 | 0.4183 | 0.7721 | 0.8677 | 0.8775 |
| MeanAP | 0.3270 | 0.2242 | 0.3822 | 0.3924 | 0.4394 |

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A method, comprising:
using a Markov chain, by a software program executable in a processor-based system, to model color spatial co-occurrence information of an image received by the processor-based system;
accumulating, by the software program, a color spatial co-occurrence matrix of the image using the modeled color spatial co-occurrence information;
calculating, by the software program, a Markov transition matrix from the co-occurrence matrix; and
generating, by the software program, a Markov stationary color descriptor of the input image using the Markov transition matrix;
wherein the Markov stationary color descriptor is a unique, invariant, and stable representation of the co-occurrence matrix.

2. The method of claim 1, further comprising:
generating, by the software program, an initial distribution of the Markov transition matrix; and
generating, by the software program, a stationary distribution of the Markov transition matrix using a limitation theorem, wherein the stationary distribution is a unique representation of the image;
wherein the Markov stationary color descriptor is based on the initial distribution and the stationary distribution.

3. The method of claim 1, further comprising:
choosing a color space of the image by the software program;
quantizing the color space into K levels by the software program.

4. The method of claim 3, accumulating a co-occurrence matrix of the image further comprising:
accumulating, by the software program, a co-occurrence matrix denoted, $C=(c_{ij})_{K \times K}$, where $c_{ij}=\#(p_1=c_i, p_2=c_j||p_1-p_2|=d)$ and $p_1$ and $p_2$ are pixels in the image, $c_i$, $c_j$ are the color levels of the pixels, and d is the distance between two pixels, $p_1$ and $p_2$.

5. A method to generate a color descriptor, the method comprising: the method comprising:
- choosing, by software running on a processor-based system, a color space of an image received by the processor-based system;
- quantizing the color space into K levels by the software;
- accumulating a color-level co-occurrence matrix of the color space by the software using a Markov chain of the image; and
- calculating a Markov transition matrix of the color space by the software;

wherein the color descriptor characterizes both inter-color and intra-color structure information of the image.

6. The method to generate a color descriptor of claim 5, further comprising:
- accumulating the color-level co-occurrence matrix of the color space, where the color-level co-occurrence matrix is denoted by:
  $C=(c_{ij})_{K \times K}$, where $c_{ij}=\#(p_1=c_i, p_2=c_j||p_1-p_2|=d)$, where $p_1$ and $p_2$ are pixels in the image, $c_i$, $c_j$ are the color levels of the pixels, and d is the distance between two $p_1$ and $p_2$;

wherein the Markov transition matrix is calculated using the co-occurrence matrix.

7. The method to generate a color descriptor of claim 5, further comprising:
- computing a stationary distribution of the Markov transition matrix by the software.

8. The method to generate a color descriptor of claim 7, further comprising:
- computing the stationary distribution by the software using a limitation theorem.

9. The method to generate a color descriptor of claim 7, further comprising:
- computing an initial distribution of the Markov transition matrix by the software, wherein a self-transition is normalized.

10. The method to generate a color descriptor of claim 9, further comprising:
- combining the initial distribution with the stationary distribution by the software, wherein the combination comprises the color descriptor of the input image.

11. An article comprising a computer-readable medium storing software, which, when executed, causes a processor-based system to:
- accumulate a co-occurrence matrix of an input image received by the processor-based system, wherein the co-occurrence matrix is based on a Markov chain that models the color spatial co-occurrence information of the input image;
- calculate a Markov transition matrix from the co-occurrence matrix; and
- generate a Markov stationary color descriptor of the input image using the Markov transition matrix.

12. The article of claim 11, further storing software on the computer-readable medium, which, when executed, causes a processor-based system to:
- generate an initial distribution of the Markov transition matrix; and
- generate a stationary distribution of the Markov transition matrix using a limitation theorem, wherein the stationary distribution is a unique representation of the input image;

wherein the Markov stationary color descriptor is based on the initial distribution and the stationary distribution.

13. The article of claim 12, further storing software on the computer-readable medium, which, when executed, causes a processor-based system to:
- choose a color space of the input image;
- quantize the color space into K levels.

14. The article of claim 12, further storing software on the computer-readable medium, which, when executed, causes a processor-based system to:
- accumulate a co-occurrence matrix denoted, $C=(c_{ij})_{K \times K}$, where $c_{ij}=\#(p_1=c_i, p_2=c_j||p_1-p_2|=d)$ and $p_1$ and $p_2$ are pixels in the image, $c_i$, $c_j$ are the color levels of the pixels, and d is the distance between two pixels, $p_1$ and $p_2$.

15. The article of claim 12, further storing software on the computer-readable medium, which, when executed, causes a processor-based system to:
- combining the initial distribution with the stationary distribution, wherein the combination comprises the color descriptor of the input image.

* * * * *

UNITED STATES PATENT AND TRADEMARK OFFICE
CERTIFICATE OF CORRECTION

PATENT NO.      : 8,059,891 B2  
APPLICATION NO. : 11/967208  
DATED           : November 15, 2011  
INVENTOR(S)     : Jianguo Li et al.

Page 1 of 1

It is certified that error appears in the above-identified patent and that said Letters Patent is hereby corrected as shown below:

On the Title Pg, Item (56), under (Other Publications), line 2, delete "Accoustics," and insert -- Acoustics, --, therefor.

In column 9, line 2, in Claim 5, after "comprising:" delete "the method comprising:".

In column 9, line 21, in Claim 6, after "two" insert -- pixels, --.

Signed and Sealed this
Third Day of January, 2012

David J. Kappos
*Director of the United States Patent and Trademark Office*